Aug. 5, 1941.  W. M. WOBBE  2,251,606
LIFTING TRUCK
Filed Feb. 1, 1939  2 Sheets-Sheet 2
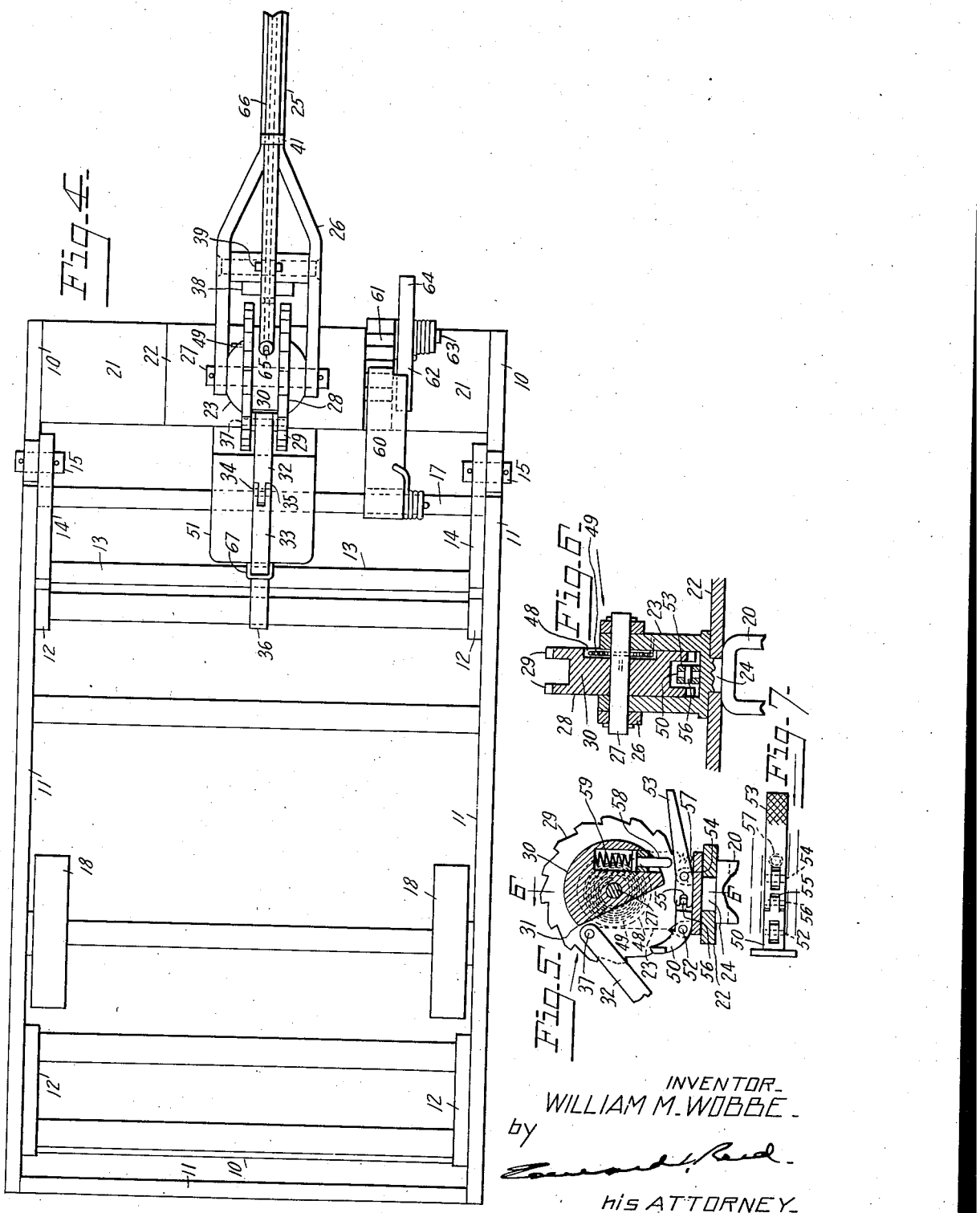
INVENTOR.
WILLIAM M. WOBBE
by
his ATTORNEY Patented Aug. 5, 1941

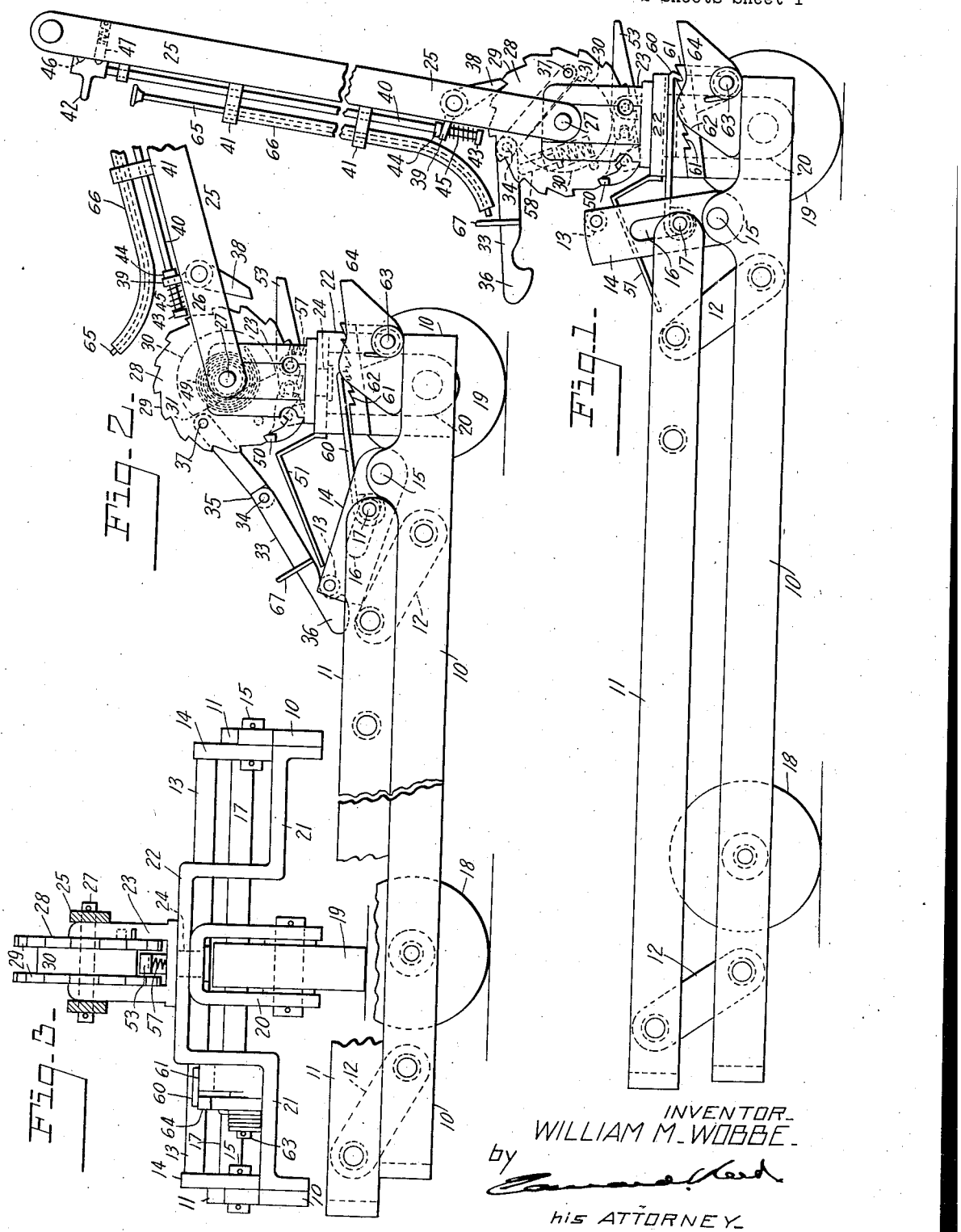

2,251,606

UNITED STATES PATENT OFFICE 2,251,606

LIFTING TRUCK

William M. Wobbe, Springfield, Ohio

Application February 1, 1939, Serial No. 254,083

15 Claims. (Cl. 254—2)

This invention relates to a lifting truck and one object of the invention is to provide such a truck with operating mechanism by means of which a heavy load may be lifted by the application of a relatively small force to the operating mechanism.

A further object of the invention is to provide such a truck with operating mechanism of such a character that the load may be lifted either by a continuous movement of the operating handle in one direction or by successive relatively short movements of the operating handle while the latter is in an upright position.

A further object of the invention is to provide such a truck with operating mechanism including a rotatable member and means whereby the rotation of said member in one direction will impart a relatively long lifting movement to the load platform.

A further object of the invention is to provide a truck with an operating mechanism by means of which the load may be easily lifted and which will be provided with means whereby the operation thereof may be easily controlled.

Other objects of the invention may appear as the apparatus is described in detail.

In the accompanying drawings Fig. 1 is a side elevation of a lifting truck embodying my invention; Fig. 2 is a similar view, partly broken away, showing the operating mechanism in a different position; Fig. 3 is a front elevation of the truck with the actuating handle in section; Fig. 4 is a plan view of the truck with the handle broken away; Fig 5 is a sectional view of parts of the operating mechanism taken through the rotatable member between the two parts thereof; Fig. 6 is a section taken on the line 6—6 of Fig. 5; and Fig. 7 is a detail view of the pawl for holding the rotatable member against reverse movement.

In these drawings I have illustrated the preferred embodiment of my invention and have shown the same as applied to a truck comprising a base 10 having mounted thereon a load platform 11 which is connected with the base for upward movement thereto, preferably by means of links 12. The load platform is provided with a lifting member adapted to be engaged by a part of the operating mechanism to move the load platform upwardly. This lifting member may be of any suitable character and may, if desired, be an integral part of the load platform but for ease of operation I prefer to use a lifting device of the type shown in my co-pending application Serial No. 242,311, filed November 25, 1938. As here shown, the lifting member is in the form of a rod 13 mounted in the outer ends of lifting arms 14 pivotally mounted at their lower ends on the base at 15. These arms are provided with longitudinal slots 16 through which extends a rod 17 carried by the front portion of the load platform so that when the lifting arms are moved from their lowered position, as shown in Fig. 2, to the elevated position of Fig. 1, the arms will engage the rod of the load platform with a cam action. The rear portion of the base is supported by wheels 18 and the forward portion thereof is supported, in the present instance, by a single wheel 19 which is rotatable about a vertical axis to steer the truck. As here shown, the steering wheel 19 is mounted in a yoke 20 which is connected with the transverse member 21 at the front end of the base for rotation about a vertical axis, the transverse member 21 of the base being provided with an upwardly offset portion 22 within which the yoke is arranged. Mounted on the part 22 of the transverse member 21 is a connecting member, here shown as a bifurcated stud 23 having a reduced lower portion 24 which extends through and is rotatable in a part 22 of the transverse member 21 and is rigidly connected with the yoke 20, so that the movement of the stud or connecting member 23 about its vertical axis will impart steering movement to the wheel 19. An operating handle 25 is connected with the connecting member or stud 23 for movement with said stud about its vertical axis and for movement with relation to said stud about a substantially horizontal axis. In the present instance, the handle 25 is provided at its lower or rear end with a forked portion 26, the arms of which are arranged on opposite sides of the stud 23 and are pivotally mounted on a shaft 27 which extends through the two arms of the bifurcated stud.

A rotatable member 28 is mounted on the connecting member 23 for rotation about a substantially horizontal axis and, as here shown, this rotatable member is arranged between the arms of the bifurcated stud and is mounted on the shaft 27. In the present arrangement this rotatable member is in the form of a ratchet wheel, and preferably comprises two laterally spaced parts rigidly connected one to the other and each provided with ratchet teeth 29. The two parts of this rotatable member may be rigidly connected one to the other in any suitable manner but preferably the connecting means is in the form of a mutilated disk 30, one side of which is cut away to provide the same with a flat surface 31. This disk may, if desired, be formed integral with the two toothed portions of the rotatable member, as shown in Fig. 6.

Connected with the rotatable member 28 for fore and aft movements thereby is an actuating member which is of elongate form and is preferably flexible about a horizontal axis. In the present instance this actuating member comprises two parts 32 and 33 which are pivotally connected one to the other at 34, the two parts being provided with cooperating shoulders 35 to limit their relative movement in one direction. The rear portion 33 of this actuating member is provided with a part, such as a hook 36, adapted to engage the lifting member 13 and thus connect the load platform with the rotatable member. The forward portion 32 of the actuating member is pivotally mounted on the rotatable member and, as here shown, this forward part extends between the two parts of the rotatable member and is pivotally connected therewith by means of a pivot pin 37 which is spaced from the axis of the rotatable member. The arrangement is such that when the rotatable member is rotated counterclockwise, as shown in Figs. 1 and 2, the point of connection 37 will move rearwardly above the axis of the rotatable member and project the actuating member rearwardly, as shown in Fig. 2, thereby enabling it to operatively engage the lifting member 13. With the actuating member in this rearmost position the rotation of the rotatable member in the other direction will move the actuating member forwardly and thus cause the latter to impart lifting movement to the load platform. As the point of connection or pivot pin 37 moves forwardly it travels in a substantially horizontal arc during the initial portion of its movement and then downwardly through a substantially vertical arc and during this latter movement very little forward movement is imparted to the actuating member by the pivot pin 37. To increase the movement which is imparted to the actuating member, and thereby enable it to lift the load platform to a higher elevation, the rotatable member is provided with a part adapted to engage the flexible actuating member at a point spaced from its point of connection 37 and to apply force to the actuating member at said point of engagement, thereby flexing the actuating member at an intermediate point, in the present instance about the pivotal connection 34, and causing the rear portion 33 of the actuating member to be moved forwardly a distance greater than the forward movement of the point of connection 37 during the downward movement of the latter. For this purpose the connecting disk 30 is so arranged that as the point of connection or pivot pin 37 begins its downward movement the straight edge portion of the disk will engage the forward portion 32 of the actuating member and will apply force thereto close to the pivotal connection 34, thereby causing the pivotal connection 34 and therefore the rear portion 33 of the actuating member to move forwardly through a substantially horizontal arc. In this manner a relatively long lifting movement may be imparted to the load platform by a rotatable member of small diameter.

The rotatable member is rotated clockwise, in Fig. 1, that is in a direction to move the actuating member forwardly, by means of a pawl 38 pivotally mounted on the operating handle 25 and arranged to engage the teeth on the two parts of the rotatable member. By means of this arrangement the load platform may be moved to its elevated position by a single forward movement of the operating handle or by successive short movements of the operating handle. Consequently if the truck should be in a position in which the handle can not be moved forwardly any substantial distance the load platform may be elevated by successive short movements of the handle while it is in an upright position. Therefore the truck cannot be "cornered" or so positioned that the load cannot be raised by means of the operating mechanism. The pawl must, of course, be moved out of engagement with the teeth of the rotatable member in order to permit the latter to rotate counterclockwise and move the actuating member to its rearmost position. For this purpose the pawl is provided with a projection or tail 39 through which extends a rod 40 slidably mounted in brackets 41 on the operating handle 25 and provided at its upper end with a finger piece 42 by means of which it may be manipulated. The projection or tail piece 39 is arranged between the spaced stops 43 and 44 on the lower portion of the rod and a spring 45 confined between the stop 43 and the projection 39 holds the projection normally in engagement with the upper stop 44 and also serves to yieldably retain the pawl in engagement with the ratchet teeth. The downward movement of the rod 40 will cause the upper stop 44 to swing the pawl out of engagement with the ratchet wheel. Any suitable means may be provided for retaining the pawl in the position to which it has been moved and, in the present instance, the rod 40 is provided near its upper end with recesses 46 adapted to receive the tapered end of a spring pressed detent 47 mounted on the handle.

Means are also provided for rotating the rotatable member counterclockwise to move the actuating member to its rearmost position and operatively engage the same with the lifting member. In the present construction spring means are provided for rotating the rotatable member in a counterclockwise direction and, as shown in the drawings, the rotatable member is provided in one face thereof with a recess 48 arranged about the shaft 27 and a spring 49 is coiled about the shaft within this recess and is secured at one end to the rotatable member and at the other end to the adjacent arm of the stud 23, so that when the rotatable member is rotated clockwise the spring will be wound and placed under tension. A detent pawl 50 holds the rotatable member against reverse rotation when it is released during the step by step movement of the operating handle 25. Therefore when the load has been fully elevated the rotatable member will be held against reverse rotation, with the spring 49 under tension. When it is desired to again connect the actuating member with the lifting member the actuating pawl 38 is moved to its inoperative position and the detent pawl 50 tripped to release the rotatable member for rotation by the spring 49 and the expansion of the spring will cause the actuating member to be projected to its rearmost position, as shown in Fig. 2. As the actuating member moves rearwardly its rear end will engage a guide plate 51 which will guide the same over the lifting member 13. The detent pawl 50 may be tripped in any suitable manner and, as here shown, it is mounted between its ends on the connecting member or stud 23, as shown at 52. A trip lever 53 pivotally mounted between its ends on the stud 23, as shown at 54, and has operative connection with the forward end of the pawl 50, as by providing the rear portion of the trip lever with a slot 55 to receive a part of the pawl 50, such as a pin 56 mounted in the forward end of the pawl. The forward portion of the trip lever extends forwardly beyond the stud to a position in which it may be easily operated and it is held normally in its elevated position by a spring 57 which also serves to yieldably retain the pawl 50 in engagement with the ratchet teeth. Thus in order to move the actuating member into operative engagement with the lifting member it is only necessary to depress the trip lever 53.

Means are also provided for automatically disengaging the actuating member from the lifting member at the end of the lifting operation so that the operating handle and connecting member 23 may be rotated about a vertical axis to effect the steering of the truck. For this purpose there is mounted in the disk shaped portion 30 of the rotatable member a plunger 58 which is pressed outwardly by a spring 59. This plunger normally projects beyond the edge of the disk 30 and is so arranged that as the actuating member approaches its foremost position the rear part 33 thereof will engage the plunger 58 and press the same inwardly against the action of the spring 59. As soon as the pressure on the actuating member is relieved, as by a slight rearward movement of the operating handle, the spring 59 will expand and the plunger will lift the actuating member to an inoperative position in which it will not interfere with the manipulation of the handle 25 to propel and steer the truck. Means are of course provided to retain the load platform in its elevated position after the actuating member has been disengaged therefrom and this means preferably comprises a yieldable detent 60 connected at its rear end to the load platform and cooperating at its forward end with a toothed plate or locking member 61 over the teeth of which the detent moves as the load platform is elevated. A tripping cam 62 is pivotally mounted on the base at 63 and underlies the detent 60. This cam is provided with a forwardly projecting arm 64 by means of which it may be moved about its axis to engage the detent 60 and move the same out of engagement with the locking member 61. The cam is so shaped that it will remain in engagement with the detent as the latter moves rearwardly due to the lowering of the load platform.

In the event the detent 50 should be inadvertently tripped after the load platform has been elevated the load will be retained in its elevated position by the detent 60 but the actuating member will be in its rearwardly extended and the lower position in which it would interfere with the rotation of the connecting member or stud 23 during the movement of the truck. To avoid the necessity of lowering the load platform and again elevating the same in order to move the actuating member to its elevated or inoperative position I have mounted on the handle 25 a rod 65 which is slidably mounted in a sheath 66 secured to the brackets 41 and has its lower portion curved. The arrangement is such that when the actuating member is in its rearmost position, as shown in Fig. 2, the downward movement of the rod 65, while the operating handle is in an upright position, will cause the lower end of the rod 65 to project rearwardly and through a loop 67 carried by the actuating member. When the rod extends through the loop a forward movement of the handle about its axis will elevate the actuating member and permit the handle and the connecting member 23 to have free movement about their vertical axis.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent, is:

1. In a lifting truck, a base, a load platform mounted on said base for upward movement with relation thereto, a lifting member connected with said load platform, a member rotatably mounted on said base on an axis transverse to said base, an actuating member having its forward end connected with said rotatable member for fore and aft movement thereby and having at its rear end a part movable by the rearward movement of said actuating member into operative engagement with said lifting member, a handle mounted on said base for movement with relation to said rotatable member, means actuated by said handle for rotating said rotatable member in a direction to move said actuating member forwardly and impart lifting movement to said lifting member, means for disengaging said actuating member from said lifting member to permit said load platform to be returned to its lowered position, and means for rotating said rotatable member in a direction to move said actuating member rearwardly and cause said part thereof to engage said lifting member.

2. In a lifting truck, a base, a load platform mounted on said base for upward movement with relation thereto, a lifting member connected with said load platform, a member rotatably mounted on said base on an axis transverse to said base, an actuating member comprising a plurality of pivotally connected parts and having means for preventing the pivotally connected ends of said parts from moving downwardly with relation to the other ends thereof substantially beyond a straight line position, said actuating member having near its rear end a part movable by the rearward movement thereof into operative engagement with said lifting member, means for connecting said rotatable member with said actuating device near the forward end of the latter to impart fore and aft movement thereto, an operable device mounted on said base for movement with relation to said rotatable member, means actuated by said operable device to rotate said rotatable member in a direction to move said actuating member forwardly and elevate said load platform, an element connected with said rotatable member for rotation therewith and arranged to engage said actuating member when said rotatable member has completed a predetermined movement and to move the pivotally connected ends of said parts of said actuating member upwardly with relation to the other ends thereof, means for retaining said load platform normally in the position to which it has been elevated, means for disengaging said actuating member from said lifting member and for releasing said load platform from said retaining means for downward movement with relation to said actuating member, and means for rotating said rotatable member in a direction to move said actuating member rearwardly into operative engagement with said lifting member.

3. In a lifting truck, a base, a load platform mounted on said base for upward movement with relation thereto, a lifting member connected with said load platform, a member rotatably mounted on said base on an axis transverse to said base, an actuating member having at its rear end a part movable into and out of operative engagement with said lifting member by the rearward movement of said actuating member and having its forward end connected with said rotatable member for fore and aft movement thereby, means for rotating said rotatable member in one direction to move said actuating member rearwardly into operative engagement with said lifting member, a handle mounted on said base for pivotal movement with relation to said rotatable member, and means actuated by said handle for rotating said rotatable member in the other direction to move said actuating member forwardly to impart upward movement to said load platform.

4. In a lifting truck, a base, a load platform mounted on said base for upward movement with relation thereto, a lifting member connected with said load platform, a member rotatably mounted on said base on an axis transverse to said base, an actuating member having at its rear end a part movable into and out of operative engagement with said lifting member by the rearward movement of said actuating member and having its forward end connected with said rotatable member for fore and aft movement thereby, a handle mounted on said base for pivotal movement with relation to said rotatable member, means actuated by said handle for rotating said rotatable member in a direction to impart forward movement to said actuating member while the latter is connected with said lifting member, and a spring connected with said rotatable member and arranged to be placed under tension by the rotation of said rotatable member in one direction and to rotate said rotatable member in the other direction and move said actuating member into engagement with said lifting member when the load platform is in its lowered position and said rotatable member is released for such movement.

5. In a lifting truck, a base, a load platform mounted on said base for upward movement with relation thereto, a lifting member connected with said load platform, a member rotatably mounted on said base on an axis transverse to said base, an actuating member having at its rear end a part movable into and out of operative engagement with said lifting member and having its forward end connected with said rotatable member for fore and aft movement thereby, a handle mounted on said base for pivotal movement with relation to said rotatable member, means actuated by said handle for rotating said rotatable member in a direction to impart forward movement to said actuating member while the latter is connected with said lifting member to elevate said load platform, releasable means for retaining said load platform in its elevated position, a spring connected with said rotatable member and arranged to be placed under tension by the rotation of said rotatable member in a direction to elevate said load platform and to rotate said rotatable member in the other direction and move said actuating member into engagement with said lifting member when said load platform is in its lowered position and said rotatable member is released for such movement, and releasable means independent of the retaining means for said platform to hold said rotatable member against movement by said spring.

6. In a lifting truck, a base, a load platform mounted on said base for upward movement with relation thereto, a lifting member connected with said load platform, a member rotatably mounted on said base on an axis transverse to said base, an actuating member having at its rear end a part movable into and out of operative engagement with said lifting member and having its forward end connected with said rotatable member for fore and aft movement thereby, a handle mounted on said base for pivotal movement with relation to said rotatable member, means actuated by said handle for rotating said rotatable member in a direction to impart forward movement to said actuating member while the latter is connected with said lifting member to elevate said load platform, releasable means for retaining said load platform in its elevated position, a spring connected with said rotatable member and arranged to be placed under tension by the rotation of said rotatable member in a direction to elevate said load platform and to rotate said rotatable member in the other direction and move said actuating member into engagement with said lifting member when the load platform is in its lowered position and said rotatable member is released for such movement, means connected with said rotatable member for disconnecting said actuating member from said lifting member and including a spring arranged to be compressed by said actuating member as the load platform approaches its fully elevated position and to expand and impart transverse movement to said actuating member when the pull on the latter is relieved.

7. In a lifting truck, a base, a load platform mounted on said base for upward movement with relation thereto, a lifting device pivotally mounted on said base and having a part extending rearwardly beneath a part of said load platform and arranged to engage the same with a cam action when said lifting device is moved upwardly and forwardly about its pivotal axis, a member mounted on said base in front of said lifting device for rotation about a transverse axis, an actuating member having at one end a part movable into and out of operative engagement with said lifting device and connected at its other end with said rotatable member for movement into operative engagement with said lifting device by the rotation of said rotatable member in one direction and for upward and forward movement to actuate said lifting device by the rotation of said rotatable member in the other direction, means for rotating said rotatable member in the first mentioned direction, a handle mounted on said base for pivotal movement with relation to said rotatable member, and means actuated by said handle for rotating said rotatable member in the last mentioned direction.

8. In a lifting truck, a base, a load platform mounted on said base for upward movement with relation thereto, a lifting device pivotally mounted on said base and having a part extending rearwardly beneath a part of said load platform and arranged to engage the same with a cam action when said lifting device is moved upwardly and forwardly about its pivotal axis, a member mounted on said base in front of said lifting device for rotation about a transverse axis, an actuating member having at one end a part movable into and out of engagement with said lifting device and connected at its other end with said rotatable member for movement into engagement with said lifting device by the rotation of said rotatable member in one direction and for upward and forward movement to actuate said lifting device by the rotation of said rotatable member in the other direction, means acting on said rotatable device for rotating the latter in the first mentioned direction, a handle pivotally mounted on said base for movement with relation to said rotatable member, means actuated by said handle to rotate said rotatable member in the last mentioned direction, said actuating member comprising pivotally connected parts, the connected ends of which are capable of being moved upwardly with relation to the other ends thereof, a member connected with said rotatable member for rotation thereby and arranged to engage said actuating member during the forward movement of the latter and to support said connected ends of the parts thereof above the level of the connection between the end of said actuating member and said rotatable member during the continued movement of said members.

9. In a lifting truck, a base, a load platform mounted on said base for upward movement with relation thereto, a lifting device pivotally mounted on said base and having a part extending rearwardly beneath a part of said load platform and arranged to engage the same with a cam action when said lifting device is moved upwardly and forwardly about its pivotal axis, a member mounted on said base in front of said lifting device for rotation about a transverse axis, an actuating member comprising a forward part pivotally connected with said rotatable member at a point spaced from the axis of the latter and a rear part pivotally connected with said forward part and movable into and out of engagement with said lifting device, a member connected with said rotatable member for rotation thereby and arranged to engage said forward part of said actuating device near its connection with said rear part thereof and to impart upward and forward movement to said rear part during the latter portion of the movement of said actuating member, means for rotating said rotatable member to move said actuating member rearwardly into engagement with said lifting device, and a handle movably mounted on said base independently of said rotatable member, and means actuated by said handle to rotate said rotatable member in a direction to move said actuating member forwardly and actuate said lifting device.

10. In a lifting truck, comprising a base, a load platform mounted on said base for upward movement with relation thereto and a lifting member connected with said load platform, a member rotatably mounted on said base and comprising two toothed members rigidly connected one to the other in axially spaced relation, an actuating device comprising two parts pivotally connected one to the other for movement into and out of substantial alinement, one part of said actuating device having its forward end portion arranged between and pivotally connected with said toothed members for longitudinal movement by the latter, the other part of said actuating device having means for connecting the same with said lifting member, said connecting means being movable into and out of operative engagement with said lifting member, an element arranged between and secured to said toothed members to engage the first mentioned part of said actuating device when said toothed members have been rotated a predetermined distance in a direction to elevate said load platform and to move said part out of alinement with the last mentioned part of said actuating device, a pawl to engage said toothed members and rotate the same in said direction, a handle pivotally mounted on said base and operatively connected with said pawl, and means to rotate said toothed members in the opposite direction and thereby move said last mentioned part of said actuating device into operative engagement with said lifting mechanism.

11. In a lifting truck, a base, a load platform mounted on said base for upward movement with relation thereto, a lifting device pivotally mounted on said base and having a part extending rearwardly beneath a part of said load platform and arranged to engage the same with a cam action when said lifting device is moved upwardly and forwardly about its pivotal axis, a member mounted on said base in front of said lifting member for rotation about a transverse axis, an actuating member comprising a forward part pivotally connected with said rotatable member at a point spaced from the axis of the latter and a rear part pivotally connected with said forward part and movable into and out of engagement with said lifting device, a member connected with said rotatable member for rotation thereby and arranged to engage said forward part of said actuating device near its connection with said rear part thereof and to impart upward and forward movement to said rear part during the latter portion of the movement of said actuating member, means for rotating said rotatable member to move said actuating member rearwardly into engagement with said lifting device and to then move the same forwardly to actuate said lifting device, releasable means to hold said lifting device against reverse movement, and means controlled by said rotatable member to disconnect said actuating member from said lifting device at the end of the lifting movement of the latter.

12. In a lifting truck, a base, a load platform mounted on said base for upward movement with relation thereto, a lifting device pivotally mounted on said base and having a part extending rearwardly beneath a part of said load platform and arranged to engage the same with a cam action when said lifting device is moved upwardly and forwardly about its pivotal axis, a member mounted on said base in front of said lifting device for rotation about a transverse axis, an actuating member having at one end a part movable into and out of engagement with said lifting device and connected at its other end with said rotatable member for movement into engagement with said lifting device by the rotation of said rotatable member in one direction and for upward and forward movement to actuate said lifting device by the rotation of said rotatable member in the other direction, an intermediate portion of said actuating member comprising articulated parts whereby an intermediate portion of said member is capable of being moved upward with relation to the ends of said member, a member connected with said rotatable member for rotation thereby and arranged to engage said intermediate portion of said actuating member during the forward movement of the latter and to support said intermediate portion above the level of the connection between the end of said actuating member and said rotatable member during the continued movement of said members, means for imparting step by step forward movement to said rotatable member, releasable means to hold said rotatable member against rearward movement, and a spring connected with said rotatable member and arranged to be placed under tension by the forward rotation of said rotatable member and to rotate said rotatable member rearwardly when the latter is released.

13. In a lifting truck comprising a base, a load platform mounted on said base for upward movement with relation thereto, and a lifting member connected with said load platform, a member mounted on said base adjacent the front end of said load platform for rotation about an axis transverse to said base, an elongate actuating member having at one end a part movable into and out of operative engagement with said lifting member and having its other end pivotally connected with said rotatable member for movement rearwardly to engaging position by the rotation of said rotatable member in one direction and for movement forwardly to elevate said load platform by the rotation of said rotatable member in the other direction, means for actuating said rotatable member, means for retaining said load platform in its elevated position, and a yieldable device carried by said rotatable member and arranged to be engaged and retracted by said actuating member as the latter nears the limit of its forward movement and to move outwardly and disengage said actuating member from said lifting member when the pressure thereon is relieved.

14. In a lifting truck comprising a base, a load platform mounted on said base for upward movement with relation thereto, and a lifting member connected with said load platform, means for steering said truck including a stud mounted on the forward portion of said base for movement about a vertical axis and having a bifurcated upper end portion, a member arranged in and rotatably mounted on the bifurcated portion of said stud and provided with ratchet teeth, an actuating member pivotally connected at one end with said rotatable member, extending rearwardly therefrom and having at its other end a part movable into and out of operative engagement with said lifting member, a handle pivotally mounted on said stud, a pawl carried by said handle to engage said ratchet teeth and rotate said rotatable member in a direction to move said actuating member forwardly, a coiled spring mounted about the axis of said rotatable member, connected at one end with said rotatable member and at the other end with said stud, and arranged to be placed under tension by the rotation of said rotatable member by said pawl, a detent to hold said rotatable member against rotation by said spring, and means for actuating said detent to release said rotatable member for rotation by said spring to move said actuating member into engagement with said lifting member.

15. In a lifting truck comprising a base, a load platform mounted on said base for upward movement with relation thereto, a lifting member connected with said load platform, and wheels supporting said base, at least one of said wheels being movable about a vertical axis at the front end of said base to steer said truck, a connecting member mounted on said base for movement about a vertical axis and connected with said steering wheel, a handle mounted on said connecting member to move said wheel about its vertical axis and for movement with relation thereto about a substantially horizontal axis, a member mounted on said connecting member for rotation about a substantially horizontal axis and provided with ratchet teeth, an elongate actuating member having at one end a part movable into and out of operative engagement with said lifting member and pivotally connected at its other end with said rotatable member at a point spaced from the axis of the latter, a pawl carried by said handle and arranged to engage said teeth and rotate said rotatable member in a direction to move said actuating member forwardly, other means for rotating said rotatable member in a direction to move said actuating member rearwardly, and a device carried by said handle to engage said actuating member while the latter is in its rearmost position and move the same to an elevated position.

WILLIAM M. WOBBE.